United States Patent [19]
Furtney et al.

[11] Patent Number: 5,579,509
[45] Date of Patent: Nov. 26, 1996

[54] APPARATUS AND METHOD FOR VERIFYING COMPATIBILITY OF SYSTEM COMPONENTS

[75] Inventors: David A. Furtney; Mark E. Ingebretson; Douglas L. Simonson, all of Rochester, Minn.

[73] Assignee: International Business Machines Corporation, Armonk, N.Y.

[21] Appl. No.: 652,820

[22] Filed: Feb. 8, 1991

[51] Int. Cl.⁶ .................................................. G06F 13/00
[52] U.S. Cl. ............................................ 395/500; 395/712
[58] Field of Search ...................... 395/500, 575, 395/600, 650, 700

[56] References Cited

U.S. PATENT DOCUMENTS

| | | | |
|---|---|---|---|
| 4,425,618 | 1/1984 | Bishop et al. | 395/375 |
| 4,558,413 | 12/1985 | Schmidt et al. | 395/600 |
| 4,696,003 | 9/1987 | Kerr et al. | 395/183.14 |
| 4,788,637 | 11/1988 | Tamaru | 395/200.1 |
| 4,809,170 | 2/1989 | Leblang et al. | 395/700 |
| 4,930,073 | 5/1990 | Cina, Jr. | 395/375 |
| 4,951,192 | 8/1990 | Chase, Jr. et al. | 395/700 |
| 5,179,703 | 1/1993 | Evans | 395/700 |

FOREIGN PATENT DOCUMENTS

| | | | |
|---|---|---|---|
| 0038147 | 10/1981 | European Pat. Off. | H04Q 3/54 |
| 0217351 | 4/1987 | European Pat. Off. | G06F 15/16 |
| 0282149 | 9/1988 | European Pat. Off. | H04Q 11/04 |
| 60-147842 | 8/1985 | Japan . | |
| 2-191031 | 7/1990 | Japan . | |

OTHER PUBLICATIONS

IBM Technical Disclosure Bulletin vol. 31, No. 8, Jan.–1989 "Management of Programming Compatibility . . . ".

IBM Technical Disclosure Bulletin, vol. 33, No. 1B, Jun. 1990, "Release N– N–1 Version Number Method With Downlevel Code and Fix Direction".

Conference on Software Maintenance—1988—Proceedings, Oct. 27, 1988, Phoenix, Arizona, pp. 126–131 "Self-Identifying Software" by Lynn H. Greene.

*Primary Examiner*—Parshotam S. Lall
*Assistant Examiner*—Viet Vu
*Attorney, Agent, or Firm*—Roy W. Truelson

[57] ABSTRACT

Each component of a plurality of interacting system components is associated with a version identifier. The version identifier is stored in a location accessible by the other components. Each component independently reads the version identifier of every other component with which it must interact, and compares this value to an internally stored compatibility record to determine whether the other component satisfies requirements for compatibility with the verifying component. Any component which detects an incompatibility signals an error to the system. In the preferred embodiment, the components are software modules, and the version identifier and compatibility record contain integer values. The compatibility record value represents the minimum level required of the module being verified for compatibility with the verifying module. Compatibility verification is accomplished by comparing the actual level of the module being verified with the minimum level in the compatibility record. If the actual level is equal to or greater than the minimum level, the module being verified satisfies compatibility requirements.

19 Claims, 3 Drawing Sheets

APPARATUS AND METHOD FOR VERIFYING COMPATIBILITY OF SYSTEM COMPONENTS

FIELD OF THE INVENTION

The present invention relates to data processing component usage, and in particular to verifying that two or more interacting components of a digital data system are compatible with each other.

BACKGROUND OF THE INVENTION

A modern computer system typically comprises a variety of different interconnected processors, each executing its own software. A single central processing unit (CPU) is typically the basic workhorse of the computer, but other processors control disk storage devices, printers, terminals, communications with other computers, etc. Even more remote and primitive processors may control other functions, such as monitoring sensors, input keypads, etc. In addition, multiple computer systems may be connected to a network, whereby they may communicate with each other.

In such a system, it is common for multiple system components to interact with each other. For example, interacting software modules may be running in separate processors or in a single processor. Processors which control peripheral functions, such as disk storage controllers, must be able to transmit data to and from the system CPU using some defined protocol. Therefore the software running in the peripheral processor must be compatible with the operating system software of the main system. Similarly, multiple software modules may be sharing the CPU and certain system resources. These modules may interact, for example, by sharing memory, and must be compatible in the way they access and alter the shared data.

System components, and particularly software modules, are subject to frequent revision, either to correct known errors in the component or to enhance its function. As a result of these frequent revisions, many versions of a component may exist, each with slightly different capabilities. Some versions of a component may therefore be incompatible with some versions of an interacting module. For example, if software modules A and B share a data structure, the addition of a new function to module A may require a new field in the data structure, and consequently require a new version of module B to support this new field.

Where multiple software modules are licensed from a single source and as a single package, the software developers can solve the problem of incompatible revision levels by guaranteeing that all modules shipped as part of the package are compatible with each other. A number of techniques exist in the art for tracking changes to software in the development environment and testing interacting modules before shipment to the customer to verify compatibility. However, where one module must interact with another from a different source, or that may have been acquired from the same source at a different time, the problem becomes more complex.

One approach to the problem is to allow the modules to execute and let standard system error recovery procedures detect incompatibility. While this may work in some cases, there is no guarantee that the system error recovery procedures will always detect incompatibility. For example, the incompatibility may be one which will corrupt data without generating an error condition. Another approach is to require that all modules be at the same level. While this guarantees module compatibility, it is unduly restrictive. Some modules may be compatible with each other even though not at the same level. This problem is particularly acute in the case of components which are not easily replaced as for example, when software for a peripheral controller is stored in a read-only memory. There exists a need for a general method of verifying compatibility of system components, which will not prevent compatible components of differing version levels from interacting.

It is therefore an object of the present invention to provide an enhanced method and apparatus for verifying compatibility of a plurality of interacting system components.

It is therefore an object of the present invention to provide an enhanced method and apparatus for verifying compatibility of a plurality of interacting software modules.

Another object of this invention to provide a more reliable method and apparatus for detecting component incompatibility.

Another object of this invention is to reduce the instances of reported incompatibility among interacting components which are in fact compatible.

Another object of this invention is to reduce the need for replacing interacting components which are in fact compatible.

Another object of this invention is to reduce the cost of operating a computer system with multiple interacting system components.

SUMMARY OF THE INVENTION

Each component of a plurality of interacting system components is associated with a version identifier, which in the preferred embodiment is an integer value. The version identifier is stored in a location accessible by the other system components. Each component independently reads the version identifier of every other component with which it must interact, and compares this value to an internally stored compatibility record to determine whether the other component satisfies requirements for compatibility with the verifying component. Any component which detects an incompatibility signals an error to the system. It is possible under this arrangement for component A to satisfy compatibility criteria required by component B, but not vice versa.

In the preferred embodiment, the components are software modules. It is assumed that a software module at any arbitrary level will satisfy all compatibility requirements that are satisfied by each lower level of that same module. The compatibility record contains an integer representing the minimum level required of the module being verified for compatibility with the verifying module. Compatibility verification is accomplished by comparing the actual level of the module being verified with the minimum level in the compatibility record. If the actual level is equal to or greater than the minimum level, the module being verified satisfies compatibility requirements.

DETAILED DESCRIPTION OF THE PREFERRED EMBODIMENT

Figure 1:
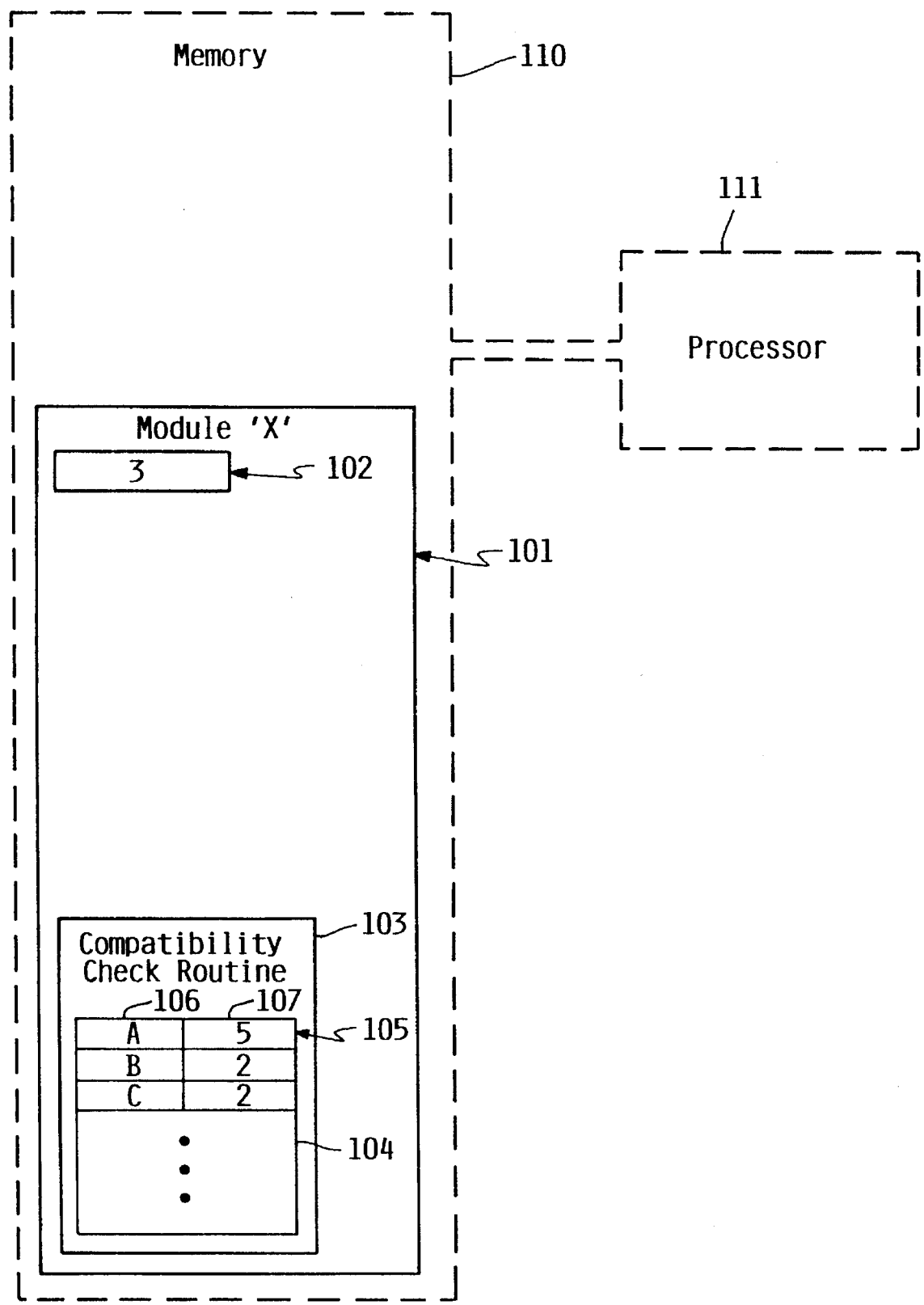
FIG. 1 shows a typical system component in its environment according to the preferred embodiment of this invention.

FIG. 1 shows a typical system component 101 in its environment according to the preferred embodiment of the present invention. In this preferred embodiment, the component is a software module 101 comprising a block of machine instructions and data stored in a memory 110. Module 101 executes in a programmable processor 111 coupled to the memory. Module 101 interacts with one or more other software modules to perform some desired function. Module 101 contains version identifier 102, which in the preferred embodiment is an integer value. In the preferred embodiment, the version identifier is stored in a pre-defined memory location in the module, from which it can be read by other modules. Module 101 also contains compatibility check routine 103, which comprises component version table 104 and a series of instructions to access the version identifiers of interacting modules and compare these to values in table 104. Component version table contains one or more entries 105, each entry corresponding to a software module with which module 101 must interact. Each entry 105 comprises component class field 106 which identifies the interacting software module, and compatible version field 107 identifying the compatible versions of the interacting module. In the preferred embodiment, compatible version field 107 is an integer representing the minimum version level of the interacting module which satisfies requirements for compatibility with software module 101.

In the preferred embodiment, compatibility check routine 103 directly accesses the version identifier in each interacting module by accessing a memory location which is a fixed offset from the beginning of the interacting module. However, any number of alternative methods could be employed. For example, in one alternate embodiment, a separate software module, callable by each of the interacting modules, could contain a fetch version function which accesses the location of the version identifiers. A software module would access the version identifier of another software module by issuing a call to the fetch version function, passing it the component name of the software module for which the version identifier is desired. In another alternative embodiment, an operating system reads all module version identifiers and creates a table of such identifiers in a location accessible to all modules. In another alternative embodiment, the module performing compatibility checking interrogates the interacting module for its version identifier via a pre-defined interface. The present invention only requires that each module in a set of interacting modules have means for accessing the version identifiers of the other modules in the set.

Figure 2:
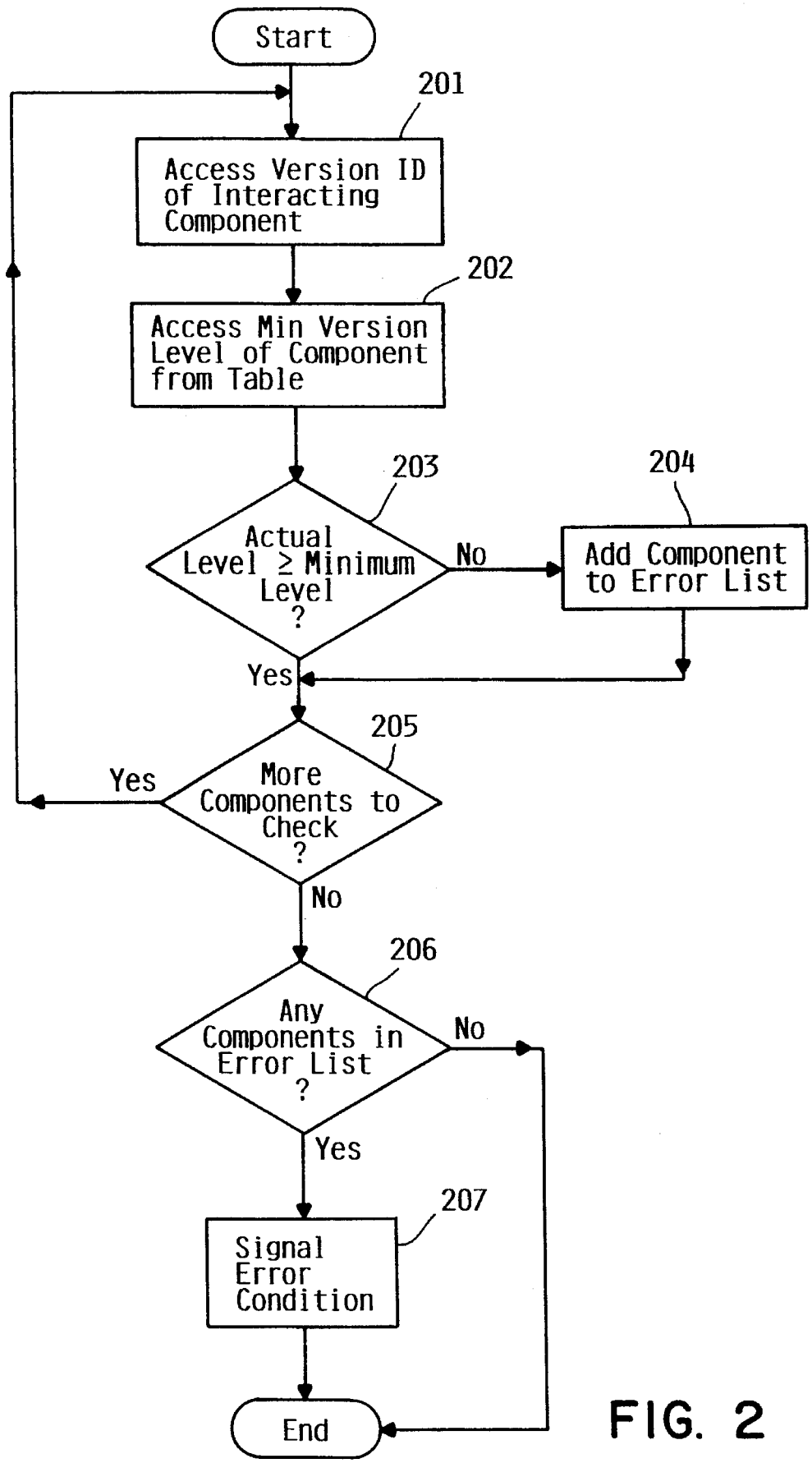
FIG. 2 is a block diagram of the steps required in each component to verify compatibility with interacting components, according to the preferred embodiment.

FIG. 2 shows the steps required in each module of a set of interacting modules to verify compatibility of the set. In accordance with this invention, each module of the set must independently verify that each other module with which it interacts satisfies minimum requirements for compatibility with the module. Each module of the interacting set first accesses the version identifier of an interacting component (step 201), and accesses the minimum version level required for compatibility with the component from its component version table 104 (step 202). If the actual level represented by the version identifier is less than the minimum level from the table (step 203), the interacting component being verified is added to an error list (step 204). If there are more interacting components to check, the process repeats (step 205), until all interacting components have been checked. When all components have been checked, if any components are in the error list (not compatible with the component performing compatibility checking) (step 206), an error condition is signalled (step 207). The response of the system to such an error condition would be dependent on the application, but it would generally mean that the modules would not be permitted to execute, because results may be unpredictable.

In the preferred embodiment, it is assumed that a software module at any arbitrary level will include the capabilities and functions of each lower level of that same module that are required for compatibility with other modules. Thus, for purposes of compatibility, a higher level of a module being verified will always satisfy minimum requirements for compatibility with the verifying module if any lower level of the module being verified satisfies such compatibility requirements. Accordingly, it is preferred that the version identifier be an integer, and that compatible version field 107 contain an integer representing the minimum level required for satisfying compatibility requirements. If this is the case, compatibility can be verified by simply comparing the two integer values, as shown at step 203. However, it is not necessary to practicing this invention that integer values be used. For example, other ordered values such as a date or real number could be used. Nor is it essential that the value be ordered. For example, in an alternative embodiment, compatible version field 107 could comprise a list of compatible version identifiers. In another alternative embodiment, compatible version field 107 could comprise an integer value representing the minimum level required for satisfying compatibility requirements as a general rule, together with a list of levels which are exceptions to the general rule. In these alternative embodiments, step 203 would be appropriately modified to compare values from compatible version field 107 with the actual version identifier in order to verify that the module being checked meets minimum requirements for compatibility with the software module performing verification.

Figure 3:
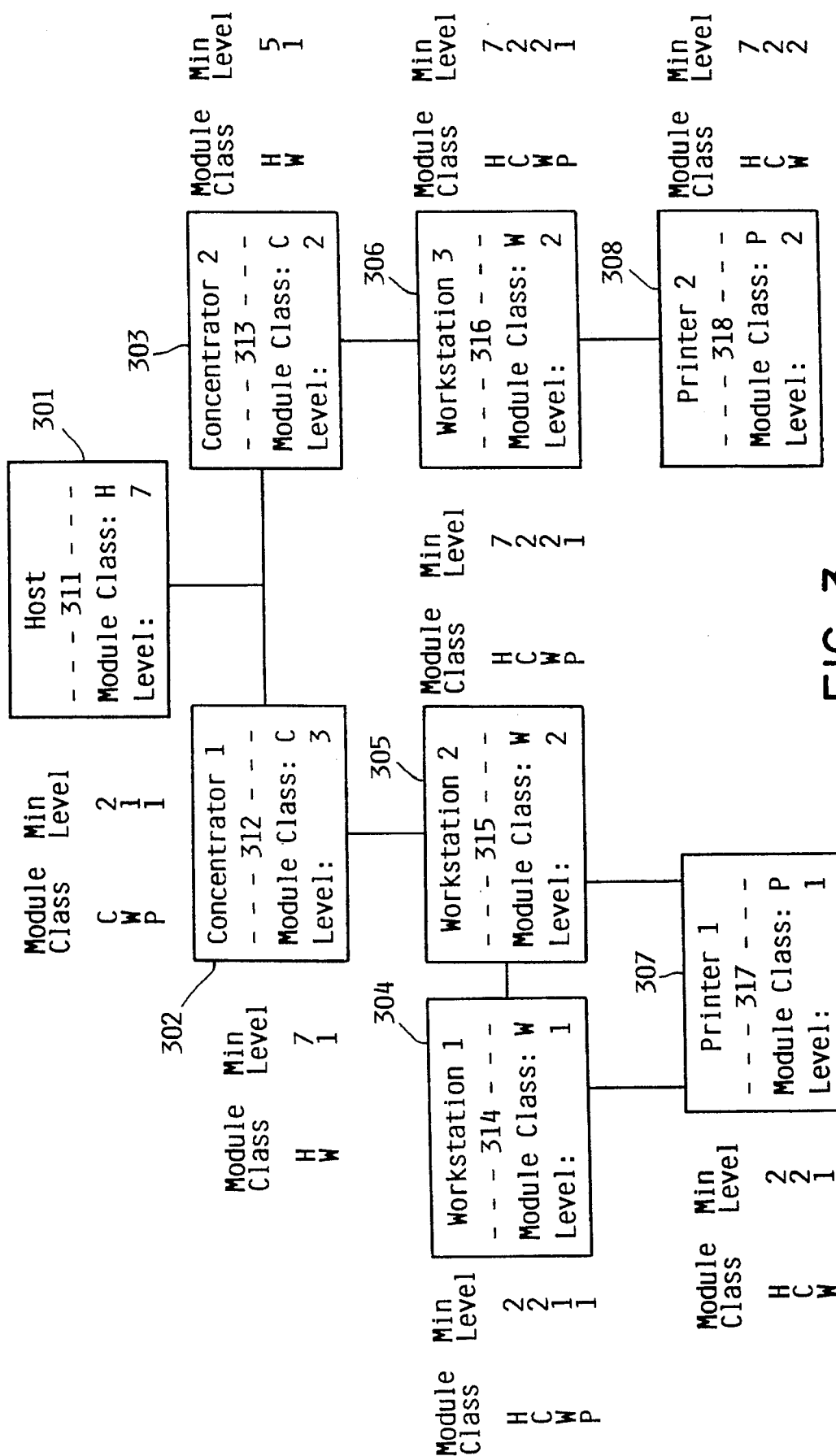
FIG. 3 shows an example of a computer system using this invention.

FIG. 3 is an example of how this invention may be employed to verify compatibility of a plurality of interacting modules performing different functions within a computer system. The system of this example comprises host 301, two concentrators 302,303, three workstations 304–306, and two printers 307,308, configured as shown. The host, concentrators, workstations and printers each comprise a programmable processor executing a respective software module 311–318 of the appropriate class. Each module 311–318 contains a component version table, the contents of which are shown beside the respective module. In this example, host module 311 requires that each concentrator module be at version level 2 or above, each workstation at version level 1 or above, and each printer at version level 1 or above. Concentrator 1 module 302 requires that the host be at or above level 7, and each attached workstation be at or above level 1. Concentrator 2 module 303 requires that the host be at or above level 5, and each attached workstation be at or above level 1. In this example, the concentrator does not care what level software module is running in the printer or in the other concentrator, and accordingly has no table entry for a printer or concentrator class module. Furthermore, a concentrator would only have to verify compatibility of the workstations which attach to it, not necessarily all workstations. It should be noted that the two concentrators are themselves at different levels, yet there is no incompatibility with the host. Both are at or above level 2, satisfying minimum level requirements for the host; the host in turn satisfies minimum level requirements for compatibility with the two concentrators. In the example of FIG. 3, there is an incompatibility between the workstation modules. Workstation 1 module 314 is at level 1 and requires other workstation modules to be at or above level 1, while workstation 2 module 315 is at level 2 and requires other workstation modules to be at or above level 2. In this example, workstation 1 module 314 would conclude that all modules with which it must interact meet minimum compatibility requirements, but workstation 2 module 315 would detect that module 314 does not meet its minimum requirements for compatibility, and raise an appropriate error condition.

The present invention achieves complete compatibility verification without generating unnecessary error conditions. Referring again to the example of FIG. 3, the concentrators are both compatible with the host although they are at different levels. A compatibility verification system which required that all modules of a particular class be at the same level would generate an error in this situation, even though all compatibility requirements are in fact met. On the other hand, a one-sided compatibility verification performed, e.g., by the host, would leave open the possibility that the host did not meet requirements of one of the other components. Suppose, for example, that a third concentrator at level 4 were added to the system of FIG. 3, and that this concentrator required that the host module be at or above level 8. In this case, a host directed verification alone would not detect the incompatibility. Finally, each module will verify compatibility only of those modules with which it must interact. In the example of FIG. 3, workstation module 314 does not meet minimum requirements for compatibility with printer module 318, but printer module 318 will not check this because printer 308 is not attached to workstation 304, and the modules don't need to be compatible. A centrally directed verification might conclude that there is some incompatibility under these circumstances.

An alternative simplified embodiment of this invention will now be described. This embodiment is a simplification of the preferred embodiment which is made possible by the fact that the interacting set of software modules contains only two modules. In this embodiment, the modules execute in a processor used to monitor power conditions in a device which is part of a computer system. The device is a pluggable device which may be replaced without altering the rest of the system, e.g., a disk drive. In addition, devices are sometimes added to the system. The system includes a plurality of such power monitoring processors in communication with each other, one of which is also in communication with the system central processing unit. The first of the software modules is stored in a permanent read-only memory coupled to the processor, while the second is stored in an electrically erasable memory coupled to the processor. From time to time the computer's operating system will download a new version of the second module, but it is unable to alter the first. As a result of a new version of the operating system, it is possible that the first module will no longer satisfy requirements for compatibility with the second. In addition, it is possible that a pluggable device will be replaced or added without an upgrade to the operating system, and consequently that the second module will no longer satisfy requirements for compatibility with the first. In this simplified embodiment, it is not necessary to maintain a component version table with entries for different modules, because only one other module need be checked. Therefore the minimum version level required to meet compatibility requirements is hard-coded into the software module as a constant value, eliminating the need for instructions that look up the value from a table. Each module compares the version level of the other module with this hard-coded constant to verify compatibility. If an incompatibility is detected, an appropriate message is sent to the operating system. The operating system may be able to cure the problem by downloading a different version of the second module; if not, appropriate action is taken to inhibit interaction between the two software modules.

Although in the preferred embodiment, the system components being verified for compatibility are software modules, in an alternative embodiment this invention can be used to verify compatibility of hardware components or components that are combinations of hardware and software. For example, electronic circuit cards in a computer system are also subject to frequent revision for the same reasons that software modules are. In accordance with this alternative embodiment, a circuit card comprises a programmable processor executing a software module. A permanent version identifier is associated with the combination of the card and its software. The card verifies compatibility with interacting circuit cards as described above for software modules.

Although a specific embodiment of the invention has been disclosed along with certain alternatives, it will be recognized by those skilled in the art that additional variations in form and detail may be made within the scope of the following claims.

What is claimed is:

1. A method for verifying that a plurality of system components executing on a computer system are compatible with each other, wherein a component version is associated with each of said plurality of components, and wherein each of said components is associated with a component version identifier identifying the component version of said component, said method comprising steps of:

obtaining the component version identifier associated with a first of said plurality of components;

determining whether the component version identified by said component version identifier associated with said first component satisfies requirements for compatibility with a second of said plurality of components;

obtaining the component version identifier associated with said second of said plurality of components; and determining whether the component version identified by said component version identifier for associated with said second component satisfies requirements for compatibility with said first of said plurality of components, wherein the determination whether the component version identified by said component version identifier associated with said second component satisfies requirements for compatibility with said first component is independent of the determination whether the component version identified by said component version identifier associated with said first component satisfies requirements for compatibility with said second component.

2. The method for verifying compatibility of claim 1, wherein each component version identifier associated with a component is stored in a fixed externally accessible location within the respective component.

3. The method for verifying compatibility of claim 1, wherein each said component is a software module.

4. The method for verifying compatibility of claim 3, wherein:

said step of determining whether the component version identified by said component version identifier associated with said first component satisfies requirements for compatibility with a second component comprises steps of: (a) accessing compatible component version identifier information in said second component, and (b) comparing said component version identifier associated with said first component with said compatible component version identifier information in said second component; and said step of determining whether the component version identified by said component version identifier associated with said second component satisfies requirements for compatibility with said first component comprises steps of: (a) accessing compatible component version identifier information in said first component, and (b) comparing said component version identifier associated with said second component with said compatible component version identifier information in said first component.

5. The method for verifying compatibility of claim 4, wherein each component version identifier associated with a component is stored in a fixed externally accessible location within the respective component.

6. The method for verifying compatibility of claim 4, wherein said compatible component version identifier information in said first and second components comprises in each of said components a table of compatible component version identifier values.

7. The method for verifying compatibility of claim 4, wherein:

said component version identifier associated with each of said first and second components comprises an ordered value representing a component version level of the respective component;

said compatible component version identifier information contained in each of said first and second components comprises an ordered value representing a minimum compatible component version level;

said step of comparing said component version identifier associated with said first component with said compatible version identifier information contained in said second component comprises comparing said ordered value representing the component version level of said first component with said ordered value representing a minimum compatible component version level in said second component and determining that said first component satisfies requirements for compatibility with said second component if said ordered value representing the component version level of said first component is greater than or equal to said ordered value representing a minimum compatible component version level in said second component; and said step of comparing said component version identifier associated with said second component with said compatible version identifier information contained in said first component comprises comparing said ordered value representing the component version level of said second component with said ordered value representing a minimum compatible component version level in said first component and determining that said second component satisfies requirements for compatibility with said first component if said ordered value representing the component version level of said second component is greater than or equal to said ordered value representing a minimum compatible component version level in said first component.

8. A first system component of a plurality of interacting components of a computer system, wherein a component version is associated with each of said plurality of interacting components, said first system component comprising:

a storage area for storing the component version, identifier of said first system component, wherein said computer system includes means for providing said component version identifier of said first system component to a second component of said plurality of interacting components;

identifier fetching means for obtaining the component version identifier associated with said second component of said plurality of interacting components;

means for accessing compatible component version identifier information for said first component, said compatible component version identifier information comprising data other than said component version identifier associated with said first system component;

comparing means for comparing said component version identifier obtained by said identifier fetching means with said compatible component version identifier information to determine whether the component version identified by said component version identifier satisfies requirements for compatibility with said first component.

9. The first system component of claim 8, wherein said component version identifier associated with said first component is stored in a fixed location within said first component accessible to means for accessing said component version identifier contained in said second component.

10. The first system component of claim 8, wherein said component is a software module.

11. The first system component of claim 8, wherein:

each said component version identifier associated with a component comprises an ordered value representing a component version level of the respective module;

said compatible component version identifier information associated with said first component comprises, an ordered value representing a minimum compatible component version level; and said comparing means compares said ordered value representing the component version level with said ordered value representing a minimum compatible component version level in said first component and determines that said component version satisfies requirements for compatibility with said first component if said ordered value representing the component version level is greater than or equal to said ordered value representing a minimum compatible component version level in said first component.

12. The first system component of claim 11, wherein said component version identifier associated with said first component is stored in a fixed location within said first component accessible to means for accessing said component version identifier contained in said second component.

13. The first system component of claim 11, wherein said component is a software module.

14. A computer system comprising:

at least one programmable processor;

a plurality of interacting system components, wherein a respective component version identifier is associated with each of said plurality of interacting components;

means for obtaining the component version identifier associated with a first of said plurality of components;

means for determining whether the component version identified by said component version identifier associated with said first module satisfies requirements for compatibility with a second of said plurality of components;

means for obtaining the component version identifier associated with said second of said plurality of components; and means for determining whether the component version identified by said component version identifier associated with said second component satisfies requirements for compatibility with said first of said plurality of components, wherein the determination whether the component version identified by said component version identifier associated with said second component satisfies requirements for compatibility with said first component is independent of the determination whether the component version identified by said component version identifier associated with said first component satisfies requirements for compatibility with said second component.

15. The computer system of claim 14, wherein each component version identifier associated with a component is stored in a fixed externally accessible location within the respective component.

16. The computer system of claim 14, wherein each said interacting system component is a software module.

17. The computer system of claim 16, wherein:

said means for determining whether the component version identified by said component version identifier associated with said first component satisfies requirements for compatibility with a second component comprises: (a) means for accessing compatible component version identifier information in said second component, and (b) means for comparing said component version identifier associated with said first component with said compatible component version identifier information in said second component; and said means for determining whether the component version identified by said component version identifier associated with said second component satisfies requirements for compatibility with said first component comprises: (a) means for accessing compatible component version identifier information in said first component, and (b) means for comparing said component version identifier associated with said second component with said compatible component version identifier information in said first component.

18. The computer system of claim 17, wherein each component version identifier associated with a component is stored in a fixed externally accessible location within the respective component.

19. The computer system of claim 17, wherein:

said component version identifier associated with each of said first and second components comprises an ordered value representing a component version level of the respective component;

said compatible component version identifier information contained in each of said first and second components comprises an ordered value representing a minimum compatible component version level;

said means for comparing said component version identifier associated with said first component with said compatible version identifier information contained in said second component compares said ordered value representing the component version level of said first component with said ordered value representing a minimum compatible component version level in said second component and determines that said first component satisfies requirements for compatibility with said second component if said ordered value representing the component version level of said first component is greater than or equal to said ordered value representing a minimum compatible component version level in said second component; and said means for comparing said component version identifier associated with said second component with said compatible version identifier information contained in said first component compares said ordered value representing the component version level of said second component with said ordered value representing a minimum compatible component version level in said first component and determines that said second component satisfies requirements for compatibility with said first component if said ordered value representing the component version level of said second component is greater than or equal to said ordered value representing a minimum compatible component version level in said first component.

\* \* \* \* \*